United States Patent [19]

Davis et al.

[11] Patent Number: 5,885,424
[45] Date of Patent: Mar. 23, 1999

[54] METHOD AND APPARATUS FOR BREAKING HYDROCARBON EMULSIONS

[75] Inventors: R. Michael Davis, Fort Worth, Tex.; Harold W. Hadley, Olds Alberta, Canada; James M. Paul, DeSoto, Tex.

[73] Assignee: Mobil Oil Corporation, Fairfax, Va.

[21] Appl. No.: 488,221

[22] Filed: Jun. 7, 1995

Related U.S. Application Data

[63] Continuation-in-part of Ser. No. 260,430, Jun. 15, 1994, abandoned.

[51] Int. Cl.$^6$ .................................................. C07B 63/00
[52] U.S. Cl. .............................. 204/157.42; 204/157.15; 204/158.2; 210/748
[58] Field of Search ........................ 204/157.15, 152.42, 204/158.2; 210/748

[56] References Cited

U.S. PATENT DOCUMENTS

| | | | |
|---|---|---|---|
| 2,257,997 | 10/1941 | Barnes | 252/349 |
| 3,017,342 | 1/1962 | Bulat et al. | 208/11 |
| 3,200,567 | 8/1965 | May | 55/175 |
| 3,594,312 | 7/1971 | Christman et al. | 208/216 |
| 3,594,314 | 7/1971 | Bilhartz et al. | 210/19 |
| 4,280,823 | 7/1981 | Szonntagh | 55/15 |
| 4,339,247 | 7/1982 | Faulkner et al. | 55/15 |
| 4,411,814 | 10/1983 | Burkhardt | 252/344 |
| 4,737,265 | 4/1988 | Merchant, Jr. et al. | 208/188 |
| 5,164,094 | 11/1992 | Stuckart | 210/708 |
| 5,344,532 | 9/1994 | Joseph | 204/157.15 |
| 5,538,628 | 7/1996 | Logan | 210/198.1 |
| 5,626,767 | 5/1997 | Trampler et al. | 210/748 |

OTHER PUBLICATIONS

"Laminar Flow," Van Nostrand's Scientific Encycl. p. 2248 ed. (5th ed. 1976).
S. Kumar, G. Chilingarian, "Oil and Gas Transport," printed in Surface Operations in Petroleum Production (1987) pp. 211–214.

*Primary Examiner*—Cecilia J. Tsang
*Assistant Examiner*—C. Delacroix-Muirheid
*Attorney, Agent, or Firm*—Malcolm D. Keen

[57] ABSTRACT

A method for breaking an emulsion comprising oil and water into oil and water phases comprising treating the emulsion with a chemical demulsifier and passing the mixture through a hollow chamber having a uniform cross-section and subjecting the mixture to acoustic energy in the frequency range of about 0.5 to 10.0 kHz, preferably 1.25 kHz, to enhance breaking the emulsion into a water phase and oil phase. The oil phase is then separated from the water phase by gravity separation and recovered. The sonic energy is generated by a transducer attached to the mid-section of the upper or lower outer surface of the hollow chamber. For emulsions containing light oil having an API gravity greater than 20 and water, the emulsion can be broken by the use of acoustic energy in the frequency range of about 0.5 to 10.0 kHz without the addition of chemical demulsifiers.

11 Claims, 10 Drawing Sheets

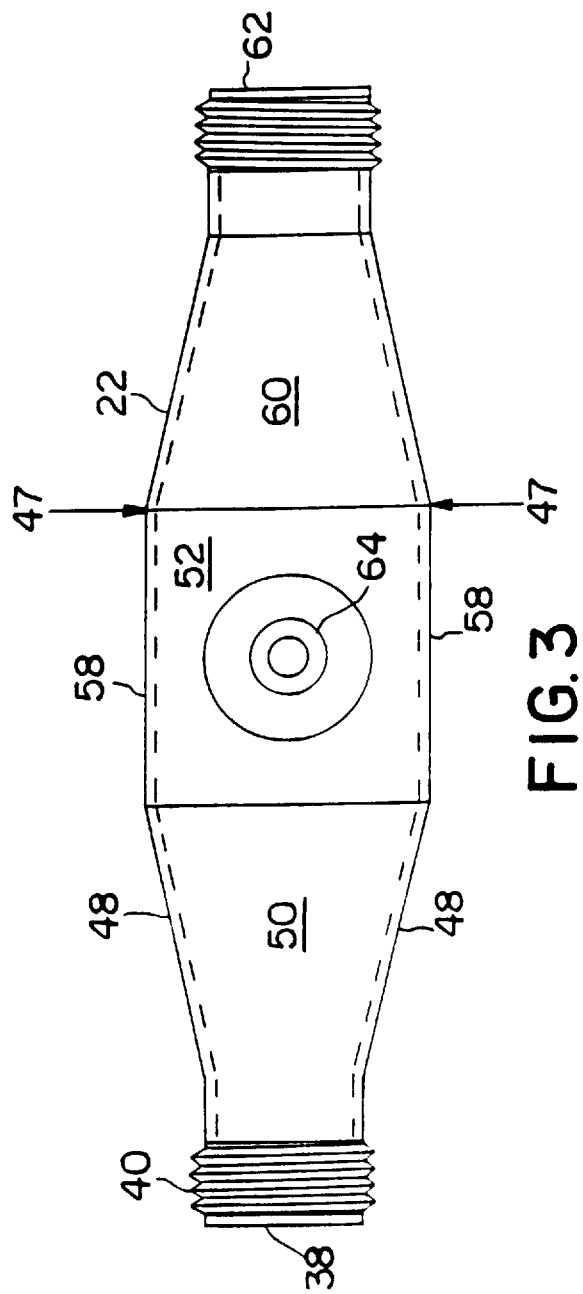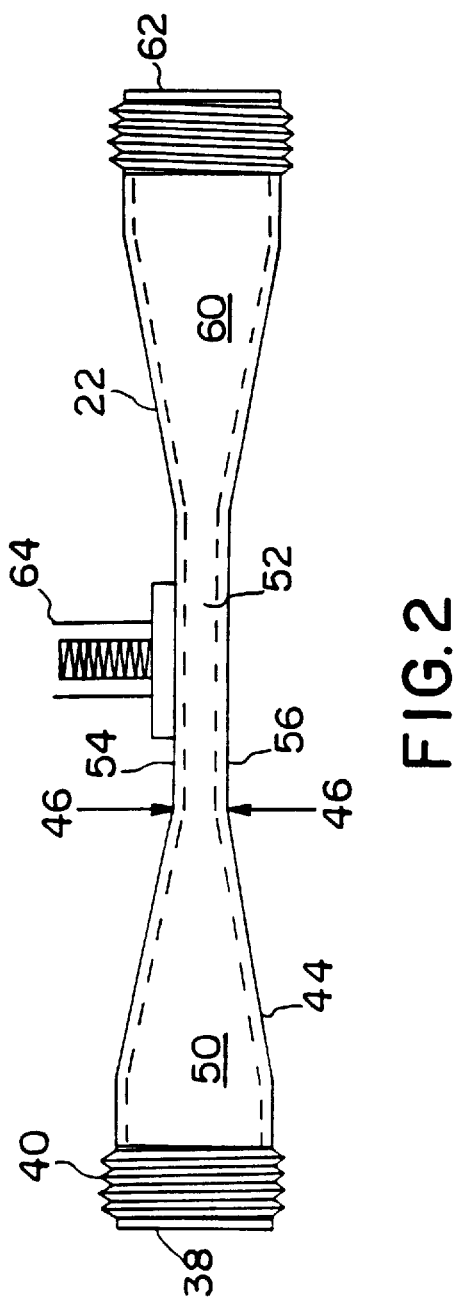

METHOD AND APPARATUS FOR BREAKING HYDROCARBON EMULSIONS

This is a continuation-in-part of prior application Ser. No. 08/260,430, filed on Jun. 15, 1994, now abandoned, which is hereby incorporated by reference.

FIELD OF THE INVENTION

This invention relates to a method and apparatus for breaking emulsions containing oil and water into separate water and oil phases. More particularly, the present invention relates to a method and apparatus for enhancing the separation of water-in-oil emulsions containing petroleum recovered from underground reservoirs into water and crude oil phases by employing sonic acoustic energy in the frequency range of about 0.5 to 10.0 kHz whether alone or in conjunction with chemical demulsifiers.

BACKGROUND OF THE INVENTION

In oil field, water usually is co-produced with crude oil and becomes entrained with the oil. The crude oil must generally be free of water (0.5% or less) before it can be sold and transported in pipelines. Thus, is it necessary to separate the oil from the water to prepare the oil for further processing and sale. The complexity of separating mixtures of water and oil depends upon the physical form of the water. Where the mixture has only "free" water, the water will separate readily from the oil because of the differences in densities of the water and oil. This type of separation presents no problem other than providing a vessel in which water-oil phase separation can occur. However, in many instances, the water can be dispersed throughout the oil in very minute particles, usually with diameters less than 25 microns, forming an "emulsion". An emulsion is very difficult and extremely expensive to separate into water and oil phases.

In these emulsions, the small particles of water are dispersed in the oil in a stable condition for several reasons. First, the area of the interface between oil and water in a stable emulsion is very substantial. For example, the interfacial area of one gallon of water dispersed within oil would range from about 1,000 to 300,000 square feet. Each separate interface must be broken to completely break the emulsion.

Furthermore, in a state of emulsion, the interfacial area of the water in the oil is stabilized against coalescence by two factors. The first factor is the minute size of the dispersed water, which effectively increases the interfacial area.

The second factor is the presence of emulsifying agents or surfactants, such as sodium, potassium, calcium or magnesium salts of organic acids, which are commonly found in producing reservoirs. These agents, which can be found dissolved in the water or the oil of the emulsion, completely coat the interfacial area to form a protective high-viscosity film that surrounds and further stabilizes the dispersed water within the continuous oil phase. This film effectively prevents the coalescence of the dispersed water in the emulsion into separate water and oil phases.

Many types of organic and inorganic materials help stabilize emulsions in this manner, in addition to the aforementioned salts of organic acids. Inorganic solids such as sand, clays, iron sulfide, iron oxide, rust, etc. stabilize water-in-oil emulsions. Organic solids such as asphaltenes and paraffin can also provide stability to emulsions. Gases are trapped in the emulsion, contributing to the stability of the emulsion.

The breaking of emulsions in which water is dispersed in the continuous crude oil phase requires performing certain functions. Initially, the water droplets must migrate towards one another, or flocculate, and the inte-facial protective film surrounding the dispersed water within the emulsion must be broken or destroyed. Then, the particles of water must coalesce into larger droplets of water which can undergo settling through the effects of gravity. Thereafter, the coalesced droplets of water are separated as a water phase from the oil phase.

Breaking of emulsions may be achieved by physical and chemical treatments, application of heat, and electrical methods. Generally, the methods for breaking water-in-oil emulsions employ a combination of these treatments. In many instances, chemical demulsifiers may be employed for assisting in the breaking of the protective film which surrounds the dispersed water. The demulsifiers are added to the emulsion to counter-act the effects of the previously mentioned emulsifying agents or surfactants, including the sodium, potassium, calcium or magnesium salts of organic acids. The demulsifier works best when it is distributed throughout the emulsion so as to be present at all interfaces of the water and oil before the emulsion is processed in a treating facility.

There are a multitude of complex chemical compositions which serve as demulsifiers for breaking water-in-oil emulsions. Surface-active materials have been used successfully as demulsifiers. The demulsifiers usually have a variety of polar components with a preferred solubility ranging from predominantly oil-soluble to predominantly water-soluble. The selection of a demulsifier for breaking a particular emulsion may be based upon actual tests and trials performed on the emulsion. Thus, it is usually not possible to predict the costs associated with the use of chemical demulsifiers, until oil production at the field begins. Usually the type of the demulsifier, and its amount in use, are best established by experimentation directly at the facility used to separate the emulsion into water and oil phases.

Chemicals, for example cationic and anionic surfactants, are commonly added to produced fluids in order to break emulsions in the oil field. Heat and mechanical methods are also commonly used alone, or in conjunction with chemicals to destabilize and break emulsions into oil and water phases. (Millions of dollars are spent each year in chemical treating and heating for control of emulsions). These costs must be added to the already significant costs involved in the production of oil from oil fields. The cost of chemical demulsifiers are one of several costs associated with the production of oil from oil fields that must be seriously considered prior to beginning oil production.

U.S. Pat. No. 3,200,567 discloses the use of ultrasonic treatment in the frequency range of 200 kHz to 400 kHz to break oil-water emulsions in a continuous flow treatment.

U.S. Pat. No. 3,594,312 discloses the use of ultrasonic treatment in the frequency range of 10 to 200 kHz to break oil-in-water emulsions.

Prior art U.S. Pat. Nos. 3,200,567 and 3,594,314, as well as other prior art patents and publications, teach a method of separating an emulsion with ultrasonic energy of a frequency greater than 10 kHz, usually 10 to 200 kHz. The prior art references cause cavitation to break the emulsion.

U.S. Pat. No. 2,257,997 also shows the use of ultrasonics in breaking oil-water emulsions. Sonic waves have been used in a hollow chamber of uniform cross-section to separate components of a fluid mixture as described in U.S. Pat. No. 4,280,823.

U.S. Pat. No. 4,339,247 describes the use of an acoustic transducer attached to a hollow chamber that generates acoustic energy which separates dissolved gases from liquids introduced into the hollow chamber.

U.S. Pat. No. 4,411,814 teaches the use of polyamines and/or polyamine salts as demulsifiers.

U.S. Pat. No. 4,737,265 teaches the use of oxyalkylated alkyl-phenol formaldehyde resins as demulsifiers.

In contrast to the prior art, in the present invention the use of frequencies in the acoustic range, from 500 Hz to 10.0 kHz, the shape of the acoustic chamber and laminar flow pattern of the emulsion through the acoustic chamber, more effectively breaks the emulsion without turbulence due to flow or acoustic cavitation that would possibly re-emulsify the water and oil.

This invention provides an effective and economical method to enhance breaking emulsions containing oil and water with the application of acoustic energy in the frequency range of 500 Hz to 10.0 kHz whether alone or in conjunction with chemical demulsifiers.

SUMMARY OF THE INVENTION

In accordance with the present invention, there is provided a method for breaking an emulsion comprising oil and water into water and oil phases comprising the steps of adding a chemical demulsifier to the emulsion to break the emulsion, subjecting the emulsion containing the chemical demulsifier to acoustic energy in the frequency range of about 500 Hz (0.5 kHz) to 10.0 kHz, more preferred 500 Hz to 2.0 kHz, most preferred 1.0 to 1.5 kHz, to enhance breaking the emulsion into a water phase and an oil phase and then separating the water phase from the oil phase. The emulsion may be heated using conventional heating means to enhance the separation of the water phase from the oil phase. This method is particularly useful for recovering crude oil from a water-in-oil emulsion produced from an underground reservoir. For emulsions containing a light oil having an API gravity greater than 20 and water, the emulsion can be broken by subjecting the emulsion to acoustic energy in the range of about 500 Hz to 10.0 kHz, without the addition of chemical demulsifiers. For emulsions containing a heavy oil, the method of invention is typically used in concurrence with chemical demulsifiers.

In accordance with another aspect of the invention, there is provided an apparatus for separating emulsions comprising oil and water into oil and water phases comprising a hollow chamber having an entrance port, said entrance port having upper and lower surfaces and a pair of sides. The distance between the upper and lower surfaces taper to a fixed distance and wherein the distance between the pair of sides increase to a fixed distance forming an entrance zone; an acoustic zone communicating with the entrance zone having upper and lower flat surfaces and a pair of sides, said distance between the upper and lower surfaces of the acoustic zone being substantially less than the distance between the pair of sides, said hollow chamber having a uniform cross-section substantially equal to the cross section of the entrance port; an exit zone communicating with the acoustic zone and an exit port communicating with said exit zone, said exit zone and exit port being a mirror image of the entrance port and entrance zone; and a transducer attached to the outer surface of the upper or lower surface of the acoustic zone to generate sonic energy in the frequency range of about 500 Hz to 10.0 kHz, more preferred 500 Hz to 2.0 kHz, most preferred 1.0 to 1.5 kHz, into the acoustic zone.

DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 2 is a side elevation view of a preferred embodiment of the acoustic chamber.

FIG. 3 is a top elevation view of the acoustic chamber of FIG. 2.

DESCRIPTION OF THE PREFERRED EMBODIMENT

Figure 1:
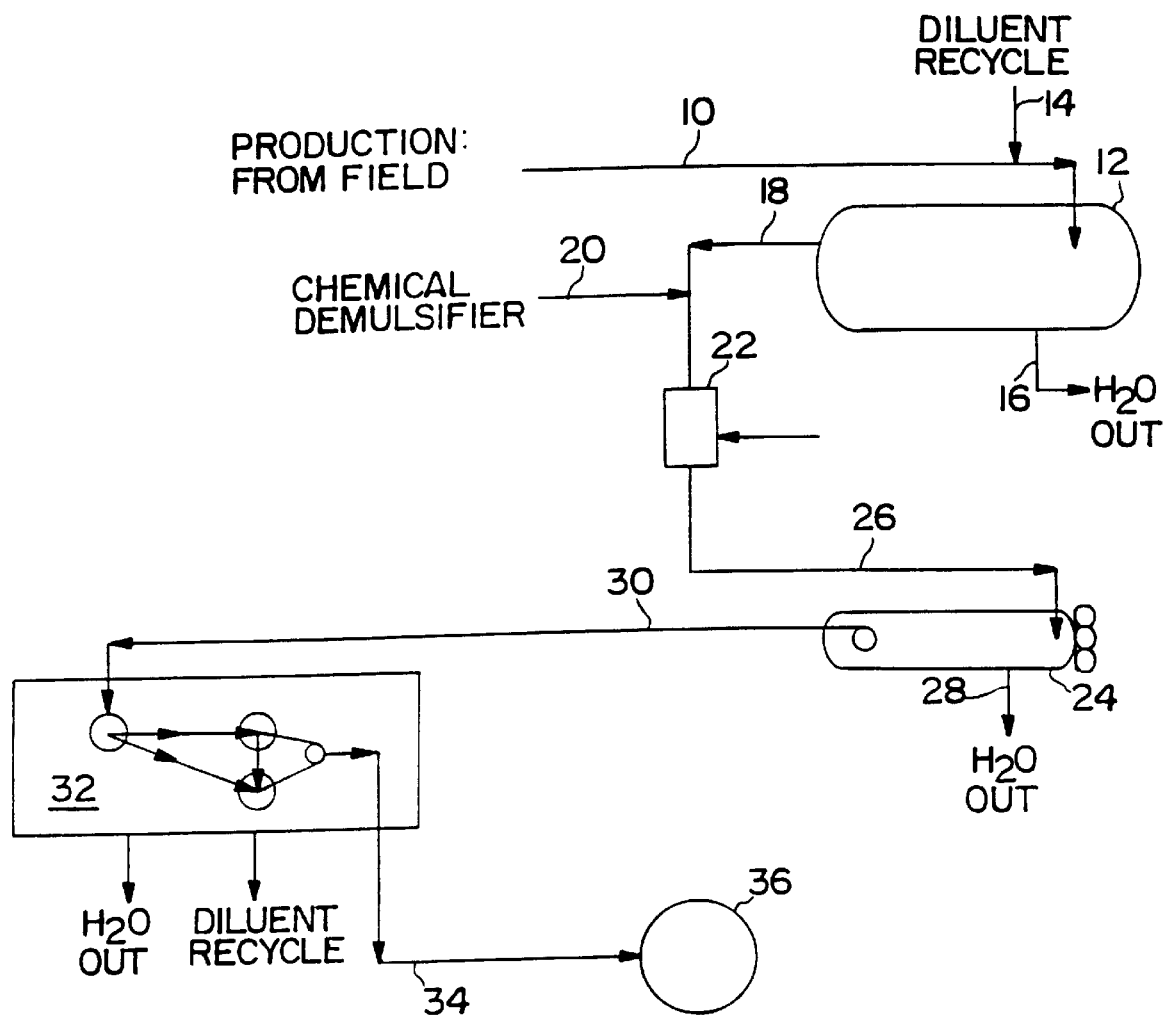
FIG. 1 is a flow sheet schematically illustrating a preferred procedure for treating a petroleum well stream in accordance with the invention.

According to the present invention, emulsions containing crude oil and water, particularly water-in-oil emulsions produced from a petroleum well or wells, are treated to break down the emulsions and separate the oil and water in a sequence of steps employing chemical demulsifiers and sonic acoustic energy in the low frequency range to enhance the efficiency of breaking the emulsion. Referring to FIG. 1, an emulsion containing heavy crude oil having an API gravity of 20 or less and water of the water-in-oil type from a production well or wells is introduced through pipe or line 10 into a free water knock out (FWKO) drum 12 where it is allowed to settle to separate the free water by gravity separation from the water-in-oil emulsions. The water in the heavy oil is generally present in the form of a water-in-oil emulsion and free water. Usually such emulsions will contain from about 10 to 90 weight percent water based on the weight of the emulsion. Just prior to the FWKO drum 12, a volume (about 20%) of recycled light hydrocarbon condensate is injected into pipe or line 10 via pipe or line 14 to improve the flow properties of the heavy oil/emulsion. About forty percent (40%) of the free water is separated from the water-in-oil emulsion and is removed from the FWKO drum 12 through pipe or line 18 and a chemical demulsifier additive is injected into the water-in-oil emulsion through pipe or line 20 to break the remaining emulsion. The additive may be used in any effective amount up to about 0.1 vol. % of the emulsion; preferably about 0.0125 to about 0.075 vol %. The mixture is then fed through an acoustic chamber 22 wherein the water-in-oil emulsion/additive mixture is subjected to a low frequency within the sonic range of about 500 hertz (Hz) to 10.0 kilohertz (kHz), more preferred 500 Hz to 2.0 kHz, most preferred 1.0 to 1.5 kHz, that increases or enhances the rate of breaking the emulsion. The flow rate into the acoustic chamber is dependent on the diameter of pipe or line 18 and the size of the acoustic chamber 22. The acoustic, or sonic, energy needed to enhance breaking the water-in-oil emulsions is in the low frequency sound spectrum. Depending on the resonant frequency of the sonic transducer, the required frequency may range from 500 hertz Hz to 10 kHz. Operating at the resonant frequency of the sonic source is desirable, because maximum amplitude, or power, is maintained at this frequency. Typically, this frequency is from 500 Hz to 10.0 kHz for the desired equipment, more preferred 500 Hz to 2.0 kHz, most preferred 1.0 to 1.5 kHz.

Sonic energy in the low frequency range enhances separation of the water-in-oil emulsions by various mechanisms including those described below. For example, when chemical demulsifiers are used in conjunction with sonic energy in the low frequency range, the sonic energy efficiently mixes the chemical demulsifiers without re-emulsification of the water and oil. The sonic energy causes violent mixing action which is exerted on the individual droplets, allowing the droplets to coalesce at a greater rate into a water phase than they would absent the sonic energy.

The mixing action also operates to lower the interfacial tension between the water droplets and the oil. There is then a fast degassing of the fluids after treatment with the acoustic unit, and the gas escapes from the emulsion in the form of free gas. The degassing reduces the viscosity of the emulsion, allowing the emulsion to flow quicker through the apparatus.

The mixing action caused by the sonic energy in the low frequency range also disperses any solids which are present in the emulsion by stripping water from the solids and "oil wetting" them or keeping the solids surrounded by the oil. The process destablizes the water/oil/solids interfaces throughout the emulsion and generally promotes separation of the oil and water.

The broken emulsion containing the water phase and oil phase exiting the acoustic flow chamber 22 is then fed into an oil-water separator tank 24 via line 26 where the emulsion is heated from a temperature of about 45° C. to 82° C. and allowed to settle and separate the water phase from the oil phase by gravity separation. An oil-water separator tank is essentially a large vessel wherein an emulsion is heated by immersed heater tubes. Water is recovered from the separator tank 24 as a lower phase and withdrawn through line 28. Oil is recovered from the separator tank 24 as an upper phase and withdrawn through line 30. The oil recovered from settling tank 24 contains about 1 to 5 wt. % water. If desired, a plurality of separator tanks may be used in parallel to separate the oil from the water. Average residence time of oil in a separator tank is in the order of about 1.5 to 4 hours. The oil is then passed through line 30 to a series of flash drums 32 where the oil is heated to a temperature of about 125° C. In the flash drums 32 any remaining water and light hydrocarbons are flashed off to an oil/water separator (not shown) where they are condensed and separated by gravity separation. The resulting recovered light hydrocarbons are then recycled into the heavy water-in-oil emulsion in line 10 to improve the flow properties of the heavy oil/emulsion. The heavy oil containing less than 0.5 wt. % water is withdrawn from the flash drums 32 via line 34 and fed to a shipping tank 36.

FIGS. 2 and 3 depict a sample of the acoustic chamber 22. The acoustic chamber 22 consists of an entrance port 38 with external screw threads 40 for connection with pipe or line 18. Referring to FIG. 2, the distance between the upper and lower surfaces 42 and 44 of the entrance port 38 taper to a fixed distance 46. Referring to FIG. 3, the distance between both sides 48 of the entrance port 38 increase to the fixed position 46 to form an entrance zone 50. Entrance zone 50 is connected to an acoustic zone 52. Referring to FIG. 2, acoustic zone 52 is enclosed by upper and lower flat surfaces 54 and 56 and as shown in FIG. 3, a pair of sides 58. The sides 58 of the acoustic zone 52 may, for example, be flat, arcuate or pointed. Acoustic zone 52 is of uniform cross-section and the cross-sectional area is substantially equal to the crossectional area of entrance port 38 so that the emulsion maintains a laminar flow and to prevent any chance of turbulence and re-emulsion of the oil and water. The thickness of the acoustic zone 52 is substantially less than the width of the upper and lower surfaces 54 and 56. The other end of the acoustic chamber 22 is provided with an exit zone 60 and an exit port 62 which are mirror images of entrance zone 50 and entrance port 38. Exit port 62 is also provided with external screw threads 64 for connection to line 26. A transducer 64 is attached to the upper surface 54 of the acoustic zone 52, preferably in the mid-section of the upper surface. The dimensions of the acoustic zone 52 are nominal, but are proportionate to the size and power output of the driving transducer 64. Recommended dimensions of the upper and lower surfaces 54 and 56 of the acoustic zone 52 are about 6" to 8" in length and about 6" to 8" in width and the recommended thickness of the acoustic zone 52 is about ⅛" to ¾", preferably ⅜". The length of the entrance zone 50 and exit zone 60 is proportional to the outside diameter (OD) of the entrance port 38 and the width 47 of the acoustic zone 52 to maintain laminar flow. The diameter of the entrance port 38 will vary depending upon the diameter of the existing piping, line or pipe 18, in the plant connected to the acoustic chamber 22. The acoustic chamber 22 may be fabricated from stainless steel or other materials by conventional means or formed by flattening metal tubing.

Figure 4:
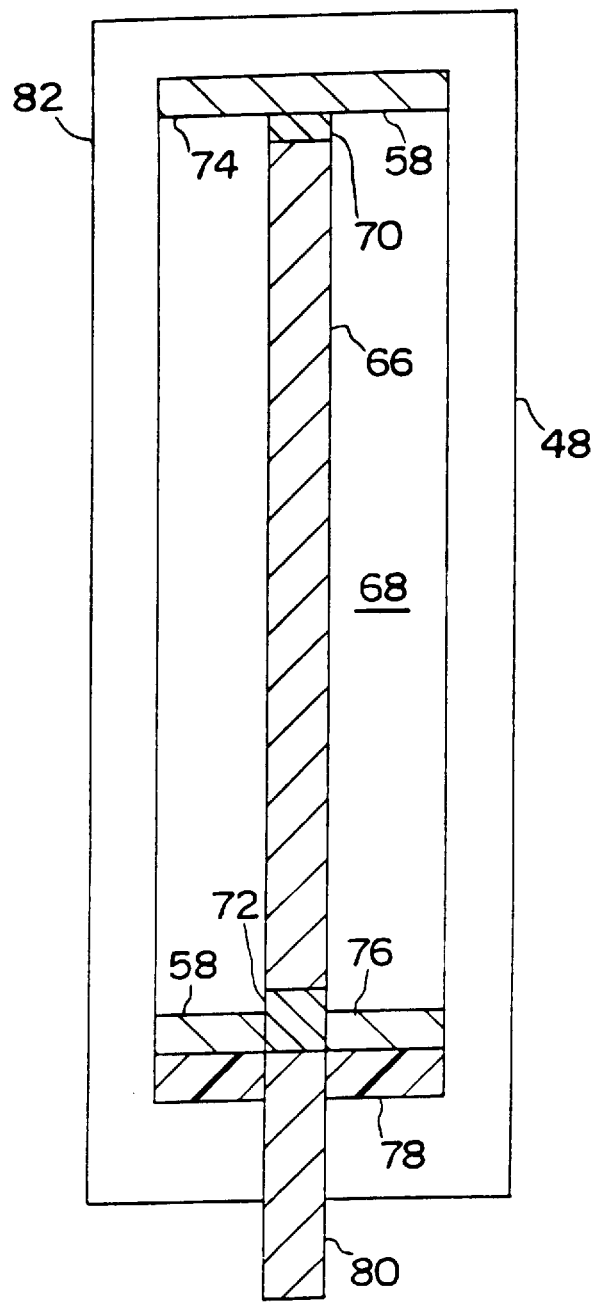
FIG. 4 is a diagram of the acoustic transducer.

The sonic energy is generated by a transducer 64 of the electrical-acoustic type adapted to convert electrical energy into mechanical vibrations that are introduced into the acoustic zone 52. The upper and lower flat surfaces 54 and 56 of the acoustic zone 52 function as plates that contain the acoustic energy. The transducer 64 is a magnetostrictive transducer. A suitable transducer is manufactured under the trade designation "T"-Motor® by Sonic Research Corporation, Moline, Ill., that generates sonic vibrations having a frequency within the range of about 500 Hz to 10.0 kHz. In the embodiment of FIG. 4, the transducer consists of a magnetostrictive material in the form of rods 66 compressed together and wrapped with a wire coil 68. The opposite ends 70 and 72 of rod 66 abut permanent magnets 74 and 76, respectively. The end 76 of rod 66 is abutted by a pre-stress washer 78 and connected to actuator rod 80. The coil 68, magnet 74 and pre-stress washer 78 are encased in a casing 82. The rods 66 comprise 90% iron, 5% terbium and 5% dysprosium sold under the trade designation "Terfenol-D" by Edge Technologies, Inc., Ames, Iowa. The Terfenol-D rod is the only material known that can produce variable frequency, and withstand high temperature and pressure. The rods vibrate length wise when a DC current flows through the coil 68. The induced magnetic field causes the rods to expand and contract, i.e. magnetostrictive motion. This motion, or vibration, generates an acoustic wave or sonic energy having a frequency in the range of 500 Hz to 10.0 kHz which extends forward from the transducer for some distance. The transducer is powered by a standard frequency generator and a power amplifier. A suitable transducer for use in the present invention is disclosed in U.S. Pat. No. 4,907,209 which issued to Sewall et al. on Mar. 6, 1990. This patent is incorporated herein by reference.

The chemical demulsifier may be any one selected from those which can be employed to assist in the breaking and separating of water and oil phase from emulsions. Preferably, the demulsifier is selected from the group consisting of quaternary ammonium chloride/polyols sold by Baker Performance Chemical Inc. of Houston, Tex., under the tradename AQUANOX®9EB-371, cationic quaternary amines sold by Baker Performance Chemical, Inc., of Houston, Tex., under the tradename AQUANOX®9EB-272 and polyoxylated phenolic resin/sulphonate/polyols sold by Baker Performance Chemicals, Inc., of Houston, Tex., under the tradename AQUANOX®9EB-395.

The rate of flow of the emulsion in the acoustic chamber should be adapted to the cross-section of the acoustic chamber and the diameter of the piping that leads to the acoustic chamber, so that the emulsion moves in a laminar flow pattern and there is no turbulence that would re-emulsify the oil and water. The laminar flow may be maintained at a range of flow rates depending on the size of the acoustic chamber and the diameter of the piping. For example, for a pipe having a diameter of 2", which is attached to an acoustic chamber having upper and lower surfaces of 8" in length and 6" in width, the flow rate may be set in the range of 1,000 to 3,000 barrels per day. For a pipe having a diameter of 4", which may be attached to an acoustic chamber having upper and lower surfaces of 8" in length and 13" in width, the flow rate may be set in the range of 2,000 to 6,000 barrels per day.

The particular diameter of the pipe and cross-section of the acoustic chamber are not crucial to the invention, and pipes and acoustic chambers of various sizes may be constructed according to the terms of the invention. For all such apparatus made according to the terms of the invention, it is necessary to construct the apparatus so that a laminar flow is maintained in the pipes and acoustic chamber.

In order for laminar flow to be maintained in the pipes and acoustic chamber, it is necessary to obtain a Reynolds number ($N_{re}$) of less than or equal to 2100. As described in S. Kumar, G. Chilingarian, "Oil and Gas Transport" pp. 211–12 in *Surface Operations in Petroleum Production* (Elsevier Science Publishers 1987), $N_{re}$ is described as a dimensionless number which is calculated as follows:

$$N_{re} = \frac{dVp}{u}$$

where
- d=diameter of the conduit;
- v=velocity of the fluid;
- p=density of the fluid; and
- u=dynamic viscosity of the fluid, In an alternate embodiment of the invention, if the emulsion contains light oil having an API gravity greater than 20, the emulsion can be broken by subjecting it to acoustic energy in the frequency range of about 500 Hz to 10.0 kHz, preferably 500 Hz to 2.0 kHz, most preferably 1.0 to 1.5 kHZ, without the addition of a chemical demulsifier. The acoustic energy, shape of the acoustic chamber, and maintenance of a laminar flow pattern is sufficient to effectively break the emulsion of the light oil. In the practice of this alternate embodiment, the steps of the method would be the same as previously described except for the step of adding a chemical demulsifier and heating the broken emulsion in the oil-in-water separator tank 24 to a lower temperature in the range of about 20° C. to about 65° C.

However, in the case of heavier oils with an API gravity less than 20, it is still necessary to supplement the acoustic energy with chemical demulsifiers. The present invention, however, results in reduction of up to 75% of chemical demulsifier normally used to break water-in-oil emulsions produced from oil fields. The present invention also significantly reduces heating costs. The present invention provides a very effective method for enhancing breaking water-in-oil emulsions that is more economical and efficient than other methods presently in use. For example, 1,570 barrels of a produced water-in-oil emulsion containing 50% water using a chemical demulsifier additive enhanced with acoustic energy in the low frequency range required 37.5 liters per day less of the chemical additive to break the emulsion than when using conventional means. Decreasing the amount of additives required to break water-in-oil emulsions saves millions of dollars each year. In addition, the use of low frequency sonic acoustic energy to enhance breaking water-in-oil emulsions also significantly reduces the amount of heat required to separate the oil phase from the water phase after the emulsion has been broken since the emulsion is more efficiently coalesced and broken in the presence of low frequency sonic energy. Therefore, the present invention significantly reduces chemical treating and heating costs for breaking water-in-oil emulsions.

The following examples describe more fully the present method. However, these examples are given for illustration and are not intended to limit the invention.

EXAMPLE 1

Example for Emulsion Treating with Acoustic Energy at 1.25 kHz, using an acoustic chamber of 8" in length and 6" in width and a pipe leading to the acoustic chamber of 2" in diameter:

First Day: Acoustic energy unit installed and system equilibrated; an oil field water-in-oil emulsion containing about 90% water was fed into a free water knock out (FWKO) drum. In the FWKO drum the emulsion was allowed to settle to separate the free water from the emulsion by gravity separation. The water-in-oil emulsion fluid flow from the free-water knock out (FWKO) drum was heated to a temperature of about 40° C. to about 42° C. and then fed into an oil-water separator tank at the rate of 1,510 barrels/day (B/D); AQUANOX 272 de-emulsifier chemical additive was injected into the water-in-oil emulsion at the rate of 50 liters/day (L/D) prior to the separator tank. The chemically treated emulsion injected into the separator tank was heated to about 80° to 82° C. and the average residence time in the separator tank was 4.8 hours for the water phase and 13.4 hours for the oil phase.

Second Day: Emulsion flow from the FWKO drum (heated to 40° to 42° C.) was maintained at 1,510 B/D, chemical addition (AQUANOX 272) was reduced to 25 L/D and the water-in-oil emulsion was subjected to acoustic energy at 1.25 kHz prior to the separator. Separated oil was clean in the separator tank and it was free of water.

Third day: Acoustic energy unit turned off and chemical additive (AQUANOX 272) rate had to be increased to 50 L/D to break the emulsion. The water in the separator tank was dirty and the separation of water and oil in the separator tank was difficult with water remaining in the emulsion.

Fourth day: Acoustic energy unit turned back on at a frequency of 1.25 kHz which allowed the chemical additive (AQUANOX 272) rate to be reduced to 15 L/D to break the emulsion. This resulted in clear water and a clean oil/water separation in the separator tank. Basic sediment and water (BS&W) analysis was 0 with a small amount of solids in the oil. Chemical additive injection was then discontinued for 8 hours. BS&W indicated a small amount of water in the separated oil; returned chemical additive (AQUANOX 272) injection to 25 L/D.

Fifth day: The water/oil interface in the separator tank was clean and free of solids; chemical additive (AQUANOX 272) rate maintained at 25 L/D and emulsion subjected to acoustic energy at a frequency of 1.25 kHz. Observed clean water in separator tank, good oil/water separation and no water present in BS&W tests. Solids were oil-wet and carried over with the oil to the flash drum.

In the above example, the average amount of residual water in the oil recovered from the separator tank without acoustic treatment was about 1–5 wt. %, but when acoustic energy was applied at a frequency of 1.25 kHz, residual water was not detectable in the oil recovered from the separator tank. The above example shows that when the chemical demulsifier additive is reduced and acoustic energy is not applied the water-in-oil emulsion was not efficiently broken, but when acoustic energy was applied in conjunction with a reduced amount of chemical demulsifer additive, breaking of the emulsion was efficient. Also, the residence time of the fluids in the separator tank was significantly reduced with the application of acoustic energy at a frequency of 1.25 kHz in conjunction with the addition of a reduced amount of the chemical demulsifier additive. In fact the oil entering the separator tank was normally free of water and the water was also free of solids.

EXAMPLE 2

Figure 5:
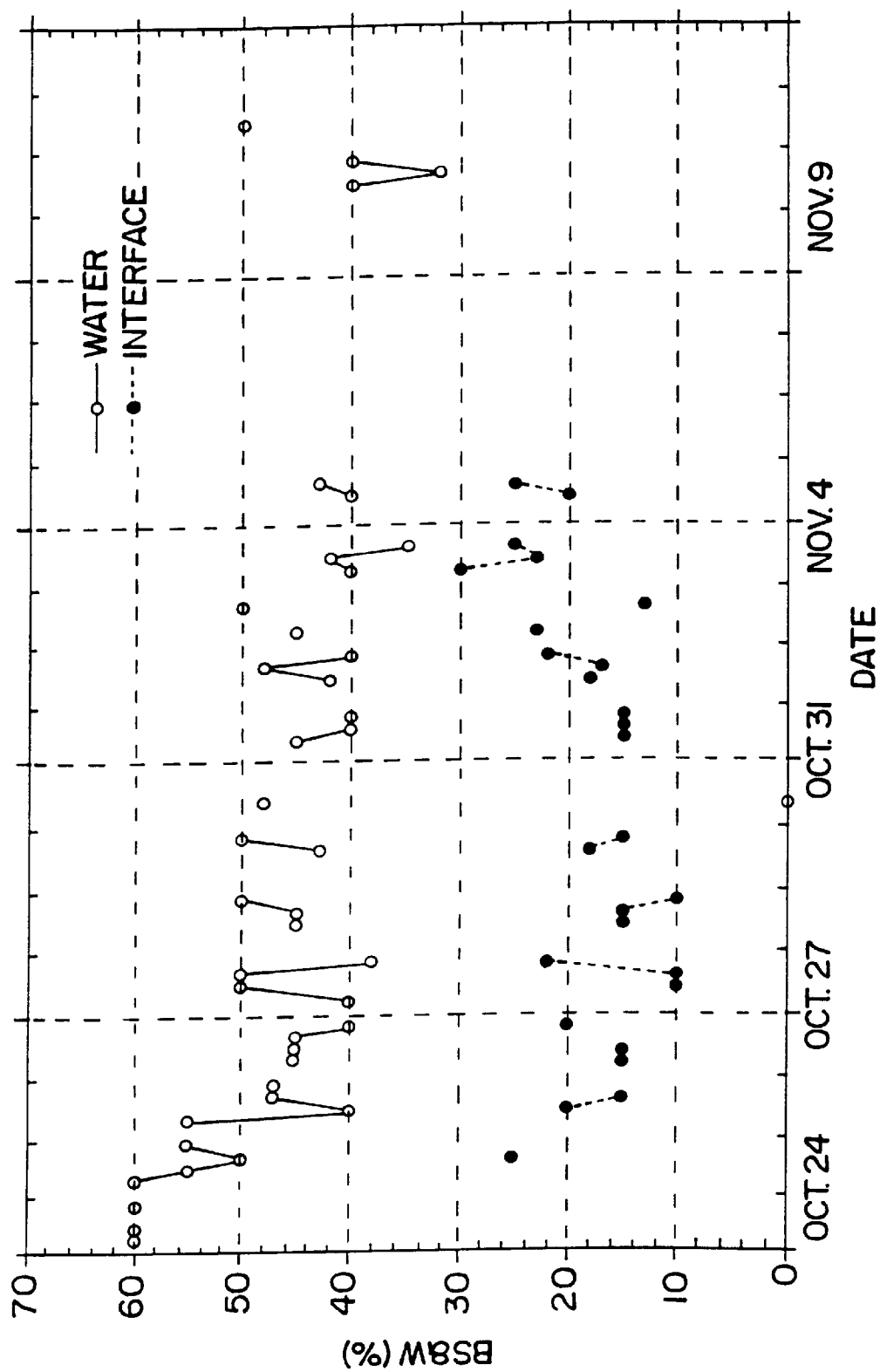
FIG. 5 is a graph showing the percent of bottom sediment and water contained in the emulsion of Example 2 over a 22-day period.

Additional tests of the invention were conducted in an oil field containing a heavy crude oil or emulsion of oil and water having an API gravity of less than 20. The emulsion contained a relatively large amount of bottom sediment and water. FIG. 5 demonstrates the amount of bottom sediment and water contained in the emulsion as it entered the FWKO drum over a 22-day period. The solid lines measure the percent of water contained in the crude/emulsion. The table shows that the percent of water varied from approximately 60% to 30% over the relevant period.

The oil was fed through the FWKO drum where the crude oil was allowed to settle to separate the free water from the water-in-oil emulsions. A chemical demulsifier additive was then injected into the crude oil to break the emulsion. The mixture was then fed through the acoustic chamber of the invention where the mixture was subjected to a low frequency of 1.25 kHz. The acoustic chamber used was 13" in width and 8" in length and the pipe leading to the acoustic chamber had a diameter of 4".

The emulsion was pumped at the rate of approximately 300 cubic meters per day ($m^3/d$), which is equivalent to approximately 1,887 barrels per day. The rate of flow was chosen to test the method. It is apparent from the disclosure that the rate could have been up to 6,000 barrels per day. As indicated by FIG. 5, the percent water content of the crude varied from approximately 30 to 60%. The chemical demulsifier was injected at a constant rate. However, since the amount of water varied, the concentration of the chemical demulsifier varied.

Three separate treaters were operated in the field. Treaters H101 and H102 contained acoustic energy units of the type disclosed in this application. At the pumping rate of 1,900 barrels per day, the emulsion generally remains in the acoustic energy unit for approximately one second. Treater H103, the control treater, did not contain an acoustic energy unit.

Samples were taken of the emulsion after it exited the treaters. A calibrated test tube was half-filled with a sample of the emulsion. Five drops of demulsifier or "knock-out drops" were also added to the emulsion. A light solvent, such as VARSOL®, was added to fill the tube. The test tube and contents were then shaken and put in a centrifuge, and the water and solids were allowed to separate. The results of these tests are set in forth in FIGS. 6 and 7.

Figure 6:
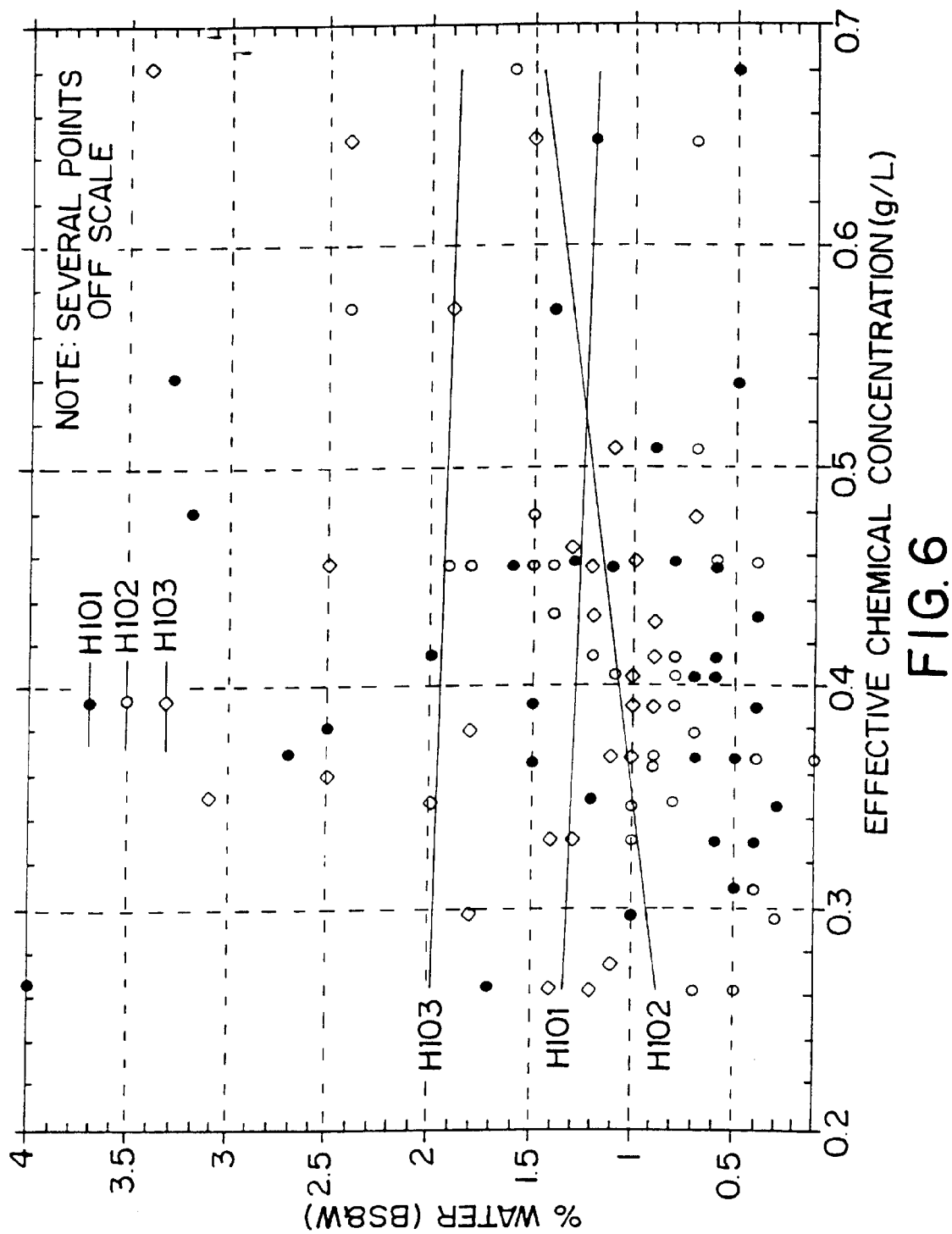
FIG. 6 is a graph showing the percent of water contained in samples of the emulsion of Example 2 after treatment at various times over a 22-day period.

FIG. 6 shows the percentage of water after treatment in the acoustic unit at various times as it varied with the effective chemical concentration of demulsifier. The values are plotted at random dates during the 22-day period.

The average values for the sample treated in the H101 treater, which contained an acoustic chamber, ranged from approximately 1.4% to 1.2% water. The value for the sample treated in the H102 treater, which also contained an acoustic chamber, ranged between approximately 0.9% and 1.4% water. The value for the sample from the control H103 treater, which does not have an acoustic chamber, ranged between approximately 2.0% and 1.8% water over the 22-day period.

Figure 7:
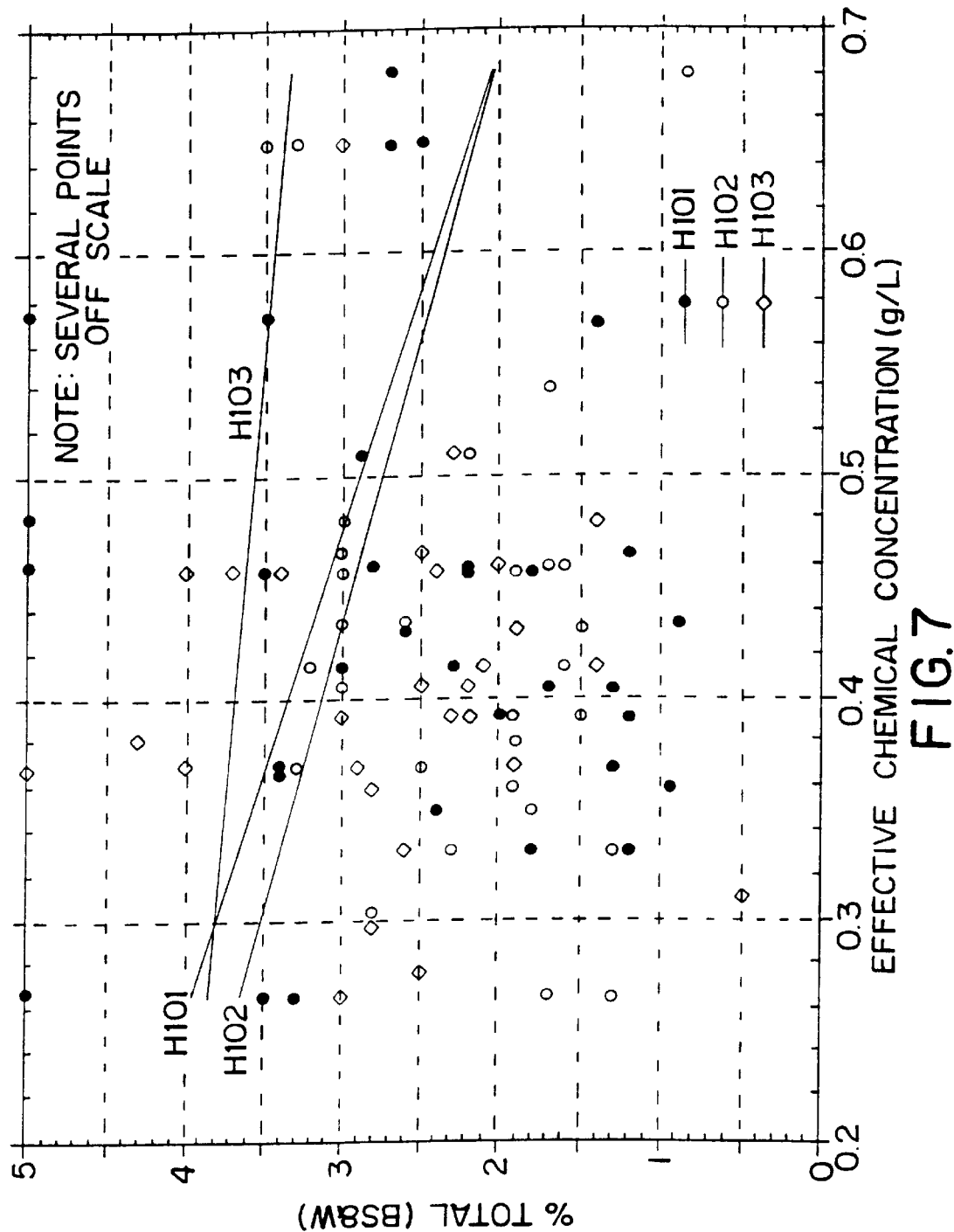
FIG. 7 is a graph showing the percent of total bottom sediment and water in samples of the emulsion of Example 2 after treatment at various times over a 22-day period.

FIG. 7 shows the average percentage of total bottom sediment and water after treatment in the same treaters over the same 22-day period. The percent of bottom sediment and water taken from the emulsion treated in the acoustic units were plotted at random dates during the 22-day period. For the sample from H101, which contained an acoustic chamber, the percent of water and sediment ranged between approximately 4.0% and 2.0%. For the sample from H102, which also contained an acoustic chamber, the percent of water and sediment ranged between approximately 3.6% and 2.0%. FIG. 6 also shows the percentage of water and sediment in treater H103, which does not have an acoustic unit. The percent of water and sediment in this treater ranged between approximately 3.2% and 3.8%.

Figure 8:
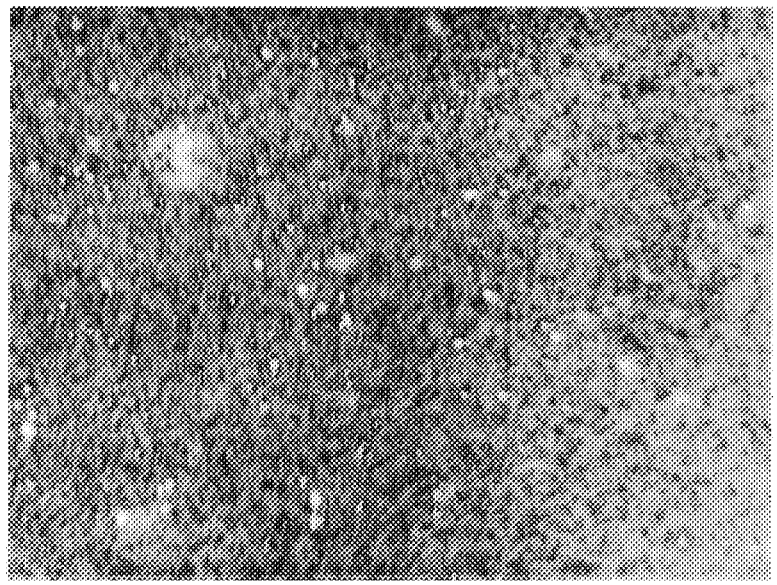
FIG. 8 is a color photograph of an oil and water emulsion after leaving a free-water knockout drum.

FIGS. 8 through 11 are color photographs of samples of the emulsion from the test depicted in Example 2. The photographs were taken with a Polaroid microscope camera known as a "Microcam". The photographs were all taken on day 16 of the 22-day period. FIG. 8 is a color photograph of a sample of the crude/emulsion after it has been allowed to sit in the FWKO drum for 11–12 hours. The orange-colored substance in the photograph is oil. The white or lightly colored substance in the photograph is water. The black or darkly colored substance is a solid, such as a sediment. The emulsion of FIG. 8 is from 40% to 60% water.

Figure 9:
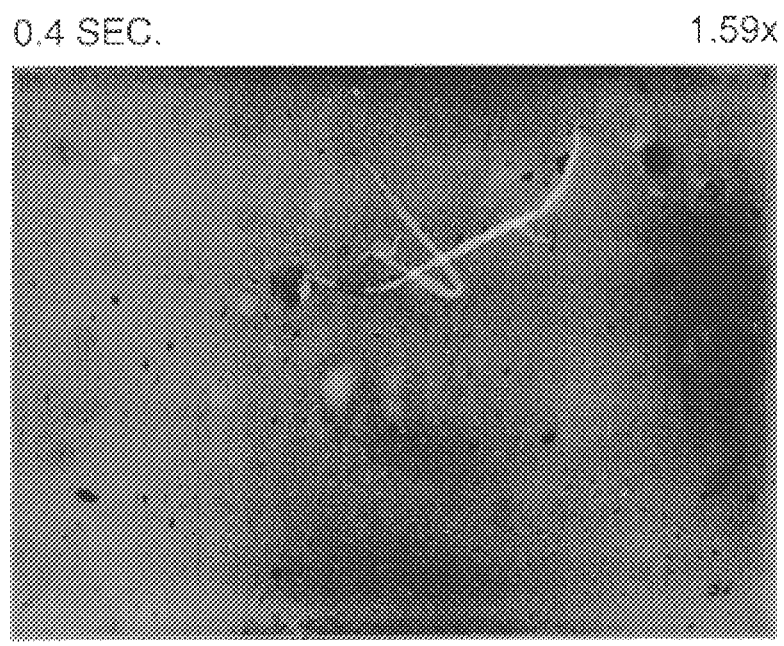
FIG. 9 is a color photograph of an oil and water emulsion after treatment with the acoustic chamber.
Figure 10:
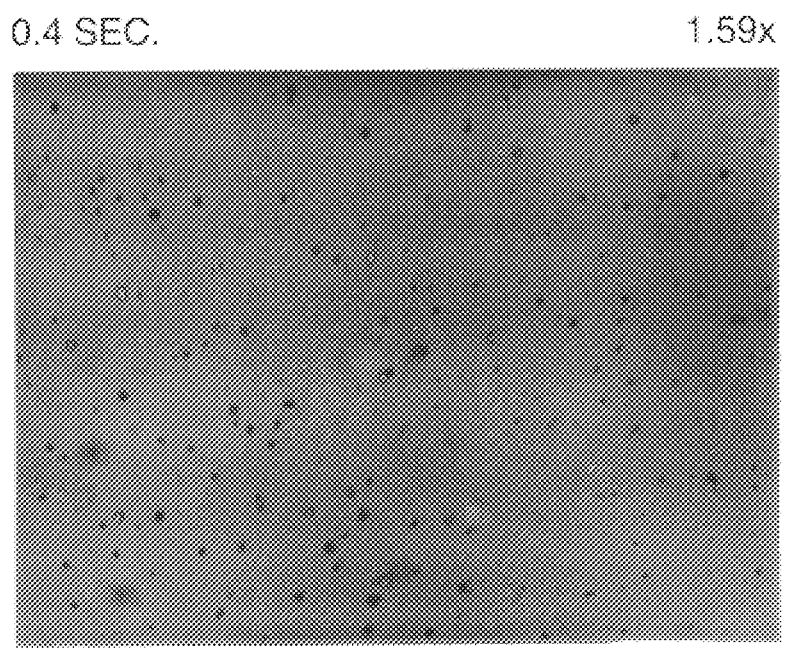
FIG. 10 is a color photograph of an oil and water emulsion after treatment with the acoustic chamber.

FIG. 9 is a color photograph of a sample of the emulsion after it has been subjected to acoustic energy through treater H101. The emulsion of FIG. 9 is found to have 0.1% water. Similarly, FIG. 10 is a color photograph of a sample of the crude/emulsion after it has been subjected to acoustic energy through treater H102. The sample of the emulsion of FIG. 10 was found to have 0.2% water.

Figure 11:
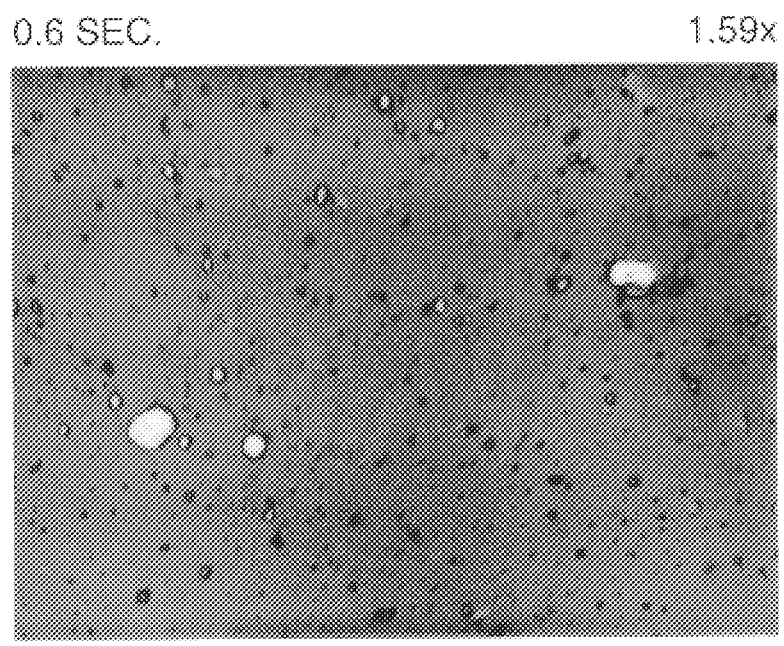
FIG. 11 is a color photograph of an oil and water emulsion which has been treated in a control treater.

FIG. 11 is a color photograph of a sample of the emulsion that was put through treater H103, the control treater. The H103 treater does not have an acoustic energy chamber. The sample of the emulsion of FIG. 11 was found to have 1.8% water. An emulsion with 1.8% water has too much water to be sold or transported in pipelines.

Following treatment in the acoustic chamber or control unit of Example 2, the emulsion was further treated at the plant. Generally, the emulsion is treated additionally with chemical demulsifiers. For the emulsions treated through treaters H101 and H102, which had been subjected to acoustic energy, approximately 30 to 35% less chemical demulsifier was needed to further break the emulsion in the plant that was needed for the emulsion from control treater H103.

It should be understood that the aforementioned examples are only illustrative of some of the results that may be obtained with the method of the invention. These examples are only representative, and are not intended to limit the terms of the invention.

Having thus described the invention, what is claimed is:

1. A method for breaking a water-in-oil emulsion produced from an underground reservoir through a petroleum well or wells, the emulsion comprising crude oil and a dispersed phase of water containing agents which stabilize the dispersed water phase in the emulsion within the continuous oil phase, the water being in the form of particles having diameters of less than 25 microns, the method, comprising the steps of:

(a) adding a chemical demulsifier to the emulsion;
   (b) injecting the emulsion into an entrance zone, said entrance zone having upper and lower surfaces and a pair of sides, wherein the distance between said upper and lower surfaces of said entrance zone taper to a fixed distance and the distance between said pair of sides of said entrance zone increase to a fixed distance;
   (c) passing the emulsion from said entrance zone into a hollow chamber of uniform cross-section having upper and lower flat surfaces and a pair of sides wherein the distance between the upper and lower surfaces is substantially less than the distance between the pair of sides;
   (d) maintaining a laminar flow of the emulsion in said entrance zone and said hollow chamber;
   (e) subjecting the emulsion in the hollow chamber to sonic energy in the frequency range of about 0.5 to 10.0 kHz by means of an acoustic transducer attached to the upper or lower outer surface of the hollow chamber thereby enhancing the breaking of the emulsion into a water phase and an oil phase, said hollow chamber having a volume proportionate to the size and power of the transducer; and
   (f) separating the water phase from the oil phase.

2. The method of claim 1 wherein during step (d) the separation of the water phase and the oil phase is enhanced by heating the mixture to a temperature of about 45° C. to about 82° C.

3. The method of claim 1 wherein the chemical demulsifier is selected from the group consisting of quaternary ammonium chloride/polyols, cationic quaternary ammonium amines and polyoxylated phenolic resin/sulphonates/polyols.

4. The method of claim 1 wherein the chemical demulsifier is present at concentrations up to 0.1 percent by volume based on the volume of the emulsion.

5. The method of claim 1 wherein the acoustic transducer is attached to the mid-section of the outer upper or lower surface of the chamber.

6. The method of claim 1 wherein the frequency is within the range of 1.0 to 1.5 kHz.

7. The method of claim 1 wherein the emulsion is heated to a predetermined temperature prior to step (a).

8. The method of claim 1 wherein the flow rate of the emulsion is equal to or greater than 1,000 barrels per day.

9. A method for breaking a water-in-oil emulsion produced from an underground reservoir through a petroleum well or wells, the emulsion comprising crude oil having an API gravity greater than 20 and a dispersed phase of water containing agents which stabilize the dispersed water phase in the emulsion within the continuous oil phase, the water being in the form of particles having diameters of less than 25 microns, the method, comprising the steps of:

(a) injecting an emulsion comprising the light oil having an API gravity greater than 20 and the water into an entrance zone, said entrance zone having upper and lower surfaces and a pair of sides, wherein the distance between said upper and lower surfaces of said entrance zone taper to a fixed distance and the distance between said pair of sides of said entrance zone increases to a fixed distance;
   (b) passing the emulsion from said entrance zone into a hollow chamber of uniform cross-section having upper and lower flat surfaces and a pair of sides wherein the distance between the upper and lower surfaces is substantially less than the distance between the pair of sides;
   (c) maintaining a laminar flow of said emulsion in said entrance zone and said hollow chamber;
   (d) subjecting the emulsion in the hollow chamber to sonic energy in the frequency range of about 0.5 to 10.0 kHz by means of an acoustic transducer attached to the upper or lower surface of the hollow chamber thereby enhancing the breaking of the emulsion into a water phase and an oil phase, said hollow chamber having a volume proportionate to the size and power of the acoustic transducer; and
   (e) separating the water phase from the oil phase.

10. The method of claim 9 wherein the frequency is within the range of 1.0 to 1.5 kHz.

11. The method of claim 9 wherein the flow rate of the emulsion is equal to or greater than 1,000 barrels per day.

* * * * *